R. RICHARDI.
PROCESS FOR MAKING WOODEN SCOOPS.

No. 185,261.          Patented Dec. 12, 1876.

UNITED STATES PATENT OFFICE.

ROBERT RICHARDI, OF BELLEVILLE, ILLINOIS.

IMPROVEMENT IN PROCESSES FOR MAKING WOODEN SCOOPS.

Specification forming part of Letters Patent No. 185,261, dated December 12, 1876; application filed June 20, 1876.

*To all whom it may concern:*

Figure 1:
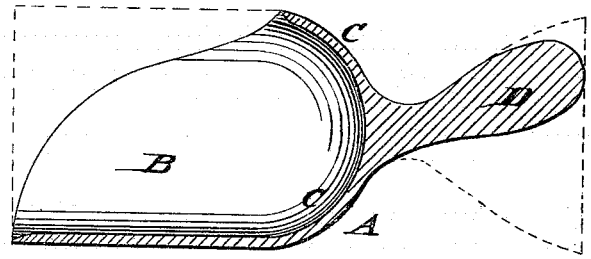
Figure 2:
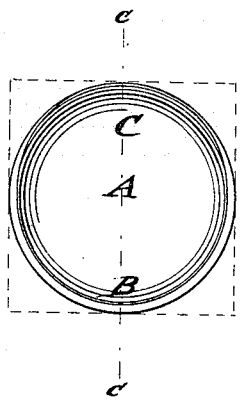

Be it known that I, ROBERT RICHARDI, of Belleville, in the county of St. Clair and State of Illinois, have invented an Improvement in Process for Making Wooden Scoops, of which the following is a specification:

In the accompanying drawing, Figure 1 represents a vertical longitudinal section on line c c, Fig. 2, of a wooden grocery-scoop manufactured by my improved method; and Fig. 2 is a front view of the same.

Similar letters of reference indicate corresponding parts.

The object of my invention is to produce an improved method by which grocery scoops that are made of one piece of wood throughout may be manufactured in a cheap, quick, and strong manner.

The invention consists in turning the scoop out of a suitable piece of wood into the shape of a goblet, and then hollowing it out at the scoop part, cutting and turning the inclined handle at proper inclination out of the rear part, and cutting finally the shape and edge of the scoop part.

In the drawing, A represents a wooden scoop, which is made of one piece of wood throughout by taking an oblong block of wood of the length and size of the scoop, as indicated in dotted lines on the drawing, and placing the same into the lathe to turn off the edges, and producing it in the shape of a goblet, with cylyndrical upper part, narrow intermediate part, and a lower foot or base part. The cylindrical part is then turned out hollow, to form the cavity for the scoop part B and head C, and the base part cut off and turned to produce the handle D, at suitable inclination to the scoop part, as shown in Fig. 1. The cylindrical part is then cut away at its top from near the back to its front end, so as to form a scoop-body, having an open top and sides, with a curved or inclined front edge, as shown in Fig. 1 of the drawing. The lower parts of the scoop and the sides of the same are formed with beveled or sharp front edges, so as to enable the scoop to penetrate easily into the material to be gathered up.

A scoop constructed according to my invention is cheap, strong, and durable, as nearly the entire work can be performed in a lathe.

It will be observed that it is necessary for the point of the scoop to be in almost a direct line between the two lathe-centers; and hence the lathe-center is extended from the driving-head almost the full length of the bowl of the scoop, and the driving-center is bent near the mandrel to make the requisite offset, keeping the point of the center at the same time in the exact line with the center of the mandrel. This enables the scoop to be so held that the handle can be readily turned.

Having thus described my invention, I claim as new and desire to secure by Letters Patent—

The process of making grocers' scoops of a single piece of wood, substantially as herein described, and for the purpose specified.

ROBERT RICHARDI.

Witnesses:
CHAS. BORN,
JOHN MERZ.